United States Patent Office.

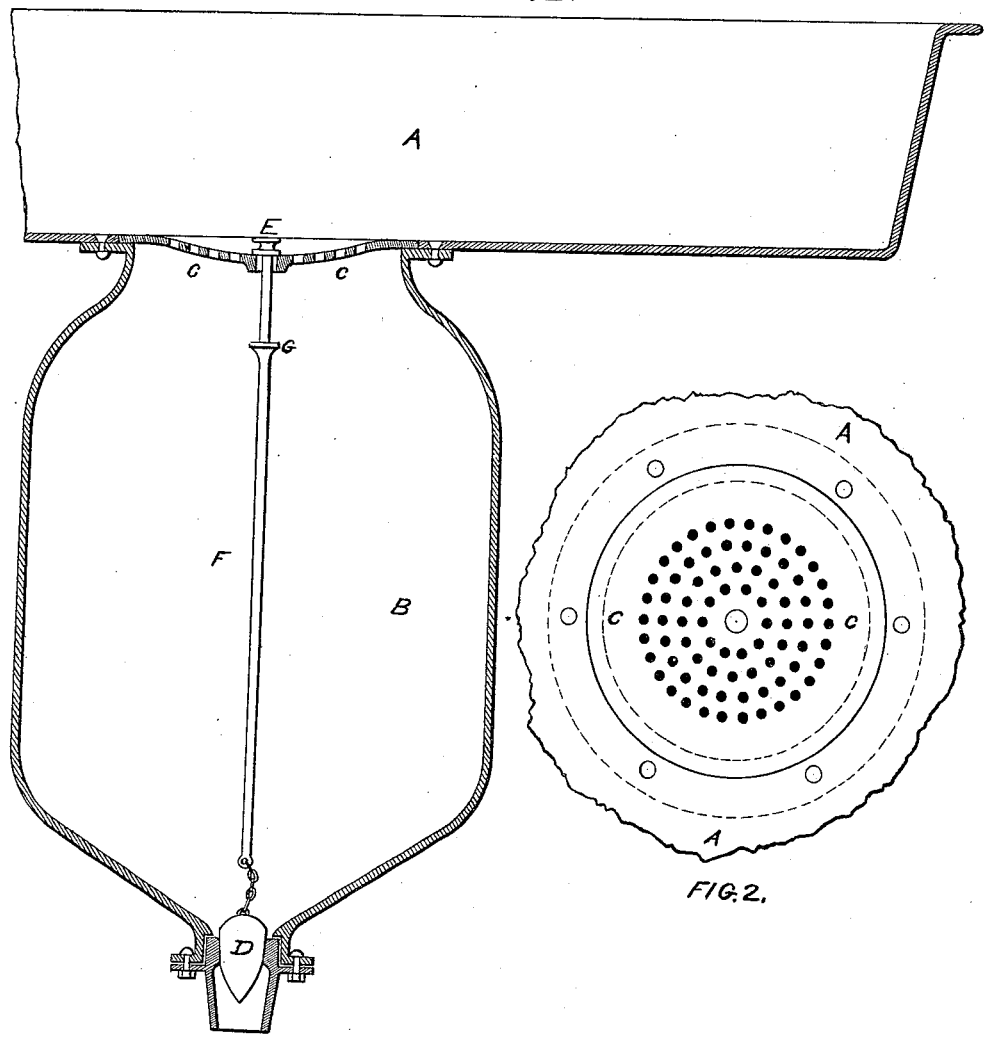

GEORGE E. WARING, JR., OF NEWPORT, RHODE ISLAND, ASSIGNOR TO THE DRAINAGE CONSTRUCTION COMPANY, OF BOSTON, MASSACHUSETTS.

FLUSH-POT FOR KITCHEN-SINKS, &c.

SPECIFICATION forming part of Letters Patent No. 263,446, dated August 29, 1882.

Application filed March 24, 1882. (No model.)

*To all whom it may concern:*

Be it known that I, GEO. E. WARING, Jr., of the city of Newport, county of Newport, State of Rhode Island, have invented a new and useful Improvement in Flush-Pots for Kitchen-Sinks, &c.; and I hereby declare that the following is a full, clear, and exact description of the same, reference being had to the accompanying drawings, forming part of this specification.

This invention has reference to an improved system for removing the liquid wastes of kitchen-sinks, pantry-sinks, and other vessels in such a manner that the grease and other adhesive substances contained in the waste may be carried forward to the outlet of the drain in such volume and with such velocity as to prevent the adhesion of the grease and other obstructive matters to the walls of the waste pipe or drain, causing them to become obstructed or reduced in capacity. There have been other devices for accomplishing this purpose. The ordinary grease-trap is practically an enlargement of the outlet-pipe arranged with an overflow, so that congealed grease shall be retained, the liquid portion of the waste being discharged by an overflow of which the intake is below the surface of the retained mass, on the top of which the grease floats. Unless frequently opened and cleansed, the accumulation of grease and other obstructive matters is such that these vessels become filled with solid matters, which, if not in time entirely obstructed, have their capacity reduced to a small water-way, through which the discharge passes unchanged for the grease to adhere to the walls of the pipe beyond. The matters retained in time enter into decomposition and become offensive and a source of foul gases which may escape into the house.

My invention consists in providing a large pot immediately under the sink, covered with a movable cover perforated to serve as a strainer. The pot is large enough to hold a considerable quantity of liquid—as, for example, the product of half a day. It is closed at its bottom by a movable plug actuated from above, or by a stop-cock. When the pot becomes full, which is shown by the failure of water in the sink to pass the strainer, the handle is raised and the whole contained volume of liquid in which the grease has mainly become congealed is discharged in full volume and with great velocity into the outlet-drain. The rod or chain connecting the handle with the plug is furnished with a stop, so that at pleasure the handle may be used for removing the cover entirely. This being removed, the whole interior of the pot is exposed to view and may be readily cleansed.

In the drawings, Figure 1 shows a vertical section through the sink, the strainer, the flush-pot, and the apparatus for opening and closing the outlet; and Fig. 2, a top view of that part of the sink to which the apparatus is attached, indicating the manner of riveting and the arrangement of the strainer.

A indicates the sink; B, the pot; C, the perforated strainer; D, the closing-plug; E, the handle for withdrawing the same; F, the connecting rod or chain, and G the stop for removing the cover.

The pot may be constructed of cast-iron, sheet metal, earthenware, wood, or other material, and may be of any convenient form or size. It need not be placed, as shown in the drawings, in immediate contact with the sink, but may, when convenience suggests, be located in the course of the waste-pipe at a distance from the sink, as in an adjoining room or in the cellar. The same device may be attached to the outlet of a slop-hopper to accumulate chamber-slops for flushing the drain.

Having thus described my invention, I claim as new and desire to secure by Letters Patent—

1. A chamber or enlargement of the water-way in the course of the discharging pipe or outlet of a sink or hopper, combined with means whereby it may be closed or opened at will for the holding back or discharging of liquid wastes, substantially as set forth.

2. In combination with a chamber or enlargement of the water-way in the course of the discharging pipe or outlet of a sink or hopper, the rod or chain F, with its handle E and its stop G, and the plug D, substantially as set forth.

GEO. E. WARING, JR.

Witnesses:
HARRY TIFFANY,
CHAS. A. NEFF.